(No Model.)
J. W. SHEARD & J. DONE.
BEARING.
No. 575,855. Patented Jan. 26, 1897.
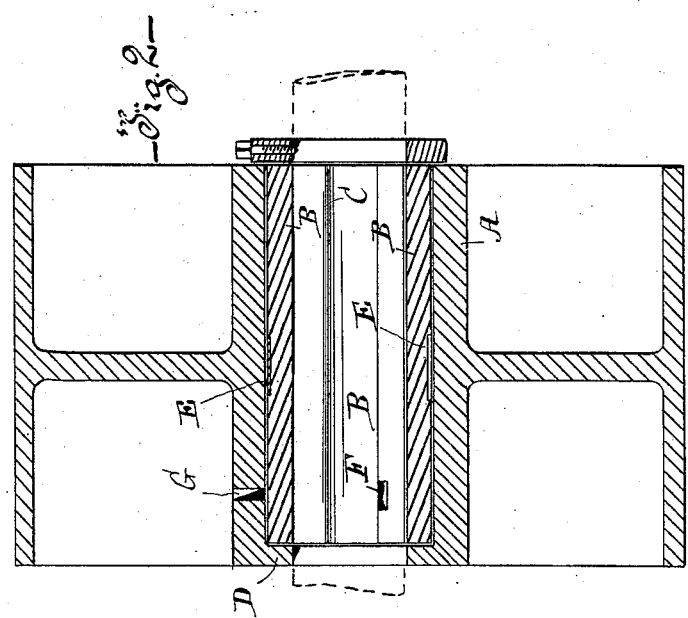
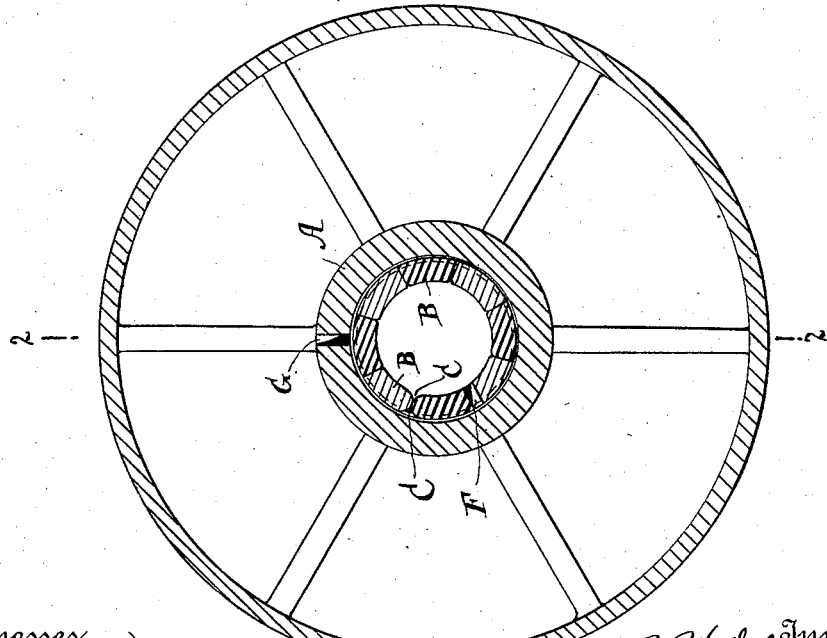

UNITED STATES PATENT OFFICE.

JOHN WILLIAM SHEARD AND JOHN DONE, OF BLACKPOOL, ENGLAND.

BEARING.

SPECIFICATION forming part of Letters Patent No. 575,855, dated January 26, 1897.

Application filed June 17, 1895. Serial No. 553,005. (No model.) Patented in England August 24, 1894, No. 16,114, and in Canada April 27, 1896, No. 52,109.

*To all whom it may concern:*

Be it known that we, JOHN WILLIAM SHEARD, a resident of 66 High Street, and JOHN DONE, a resident of 4 Dickinson Road, Blackpool, county of Lancaster, England, citizens of Great Britain, have invented certain new and useful Improvements in Bearings, (for which we have already obtained Letters Patent of Great Britain, dated August 24, 1894, and numbered 16,114, and Letters Patent of the Dominion of Canada, dated April 27, 1896, and numbered 52,109,) of which the following is a specification, reference being had to the accompanying drawings, forming a part thereof, in which similar letters of reference indicate corresponding parts.

This invention relates to bushings or linings for wheels, cylinders, journal-boxes, pulleys, &c.; and it consists of a number of small segmental pieces or strips of iron, steel, brass, gun-metal, bronze, or any other metal or composition of metals made up into the required form or forms, as hereinafter described.

The invention is fully described in the following specification, of which the accompanying drawings form a part, in which—

Figure 1 is a transverse section of a pulley provided with our improved bushing or lining; and Fig. 2, a longitudinal sectional view thereof, taken on line 2 2, Fig. 1.

Our improvement differs from the ordinary bushing consisting of brasses or similar devices in that the brasses are done away with and the segmental pieces are placed around the shaft or in the bush of the pulley-wheel or cylinder, the segments forming a circle, one or more straps being employed, where required, to keep the segments in position.

Referring to Fig. 1 of the drawings, A designates the body or hub of a pulley, B segmental sections of our improved bushing, and C C longitudinal recesses for oil, employed or formed where and when necessary and preferably on both the inner and outer sides of the bushing or lining.

The annular collar or projection D (shown in Fig. 2) is designed to keep the segments from working out or moving longitudinally, and a band E is also employed to keep the segments in position when filling.

The longitudinal recesses C C for oil or other lubricants are also shown in Fig. 2, and a small opening or perforation F for conveying the lubricant from the outer to the inner surface of the bushing, it being understood that these recesses C and the small opening are in communication with passages or perforations in the body or hub A of the pulley in the usual manner, as indicated at G, through which the oil may be supplied in the customary way.

In the case of an ordinary bearing the inside of the pedestal, cylinder, or other body can be bored out and faced to provide a recess for the segments, or the segments can be fitted to any style of ordinary bearing, and the raised annular projections or shoulders D keep the segments in position, and in the case of a loose pulley or similar device the segmental pieces form the bush or bearing and are held in place by an ordinary collar, and when the shaft or loose pulley revolves the friction will cause the segmental pieces to revolve also, but at a much slower speed.

Having fully described our invention, we claim and desire to secure by Letters Patent—

A bushing for pulleys, wheels, and cylinders, consisting of a series of segmental strips all substantially uniform in cross-section and each having smooth adjacent edges bearing against the edges of the adjoining strips, two of such strips having the adjacent outer and inner longitudinal corner edges beveled to form recesses C, C, extending longitudinally between such two strips, there being an inlet-opening F formed in the edge of and extending through another strip, and a band E encircling such strips, the whole in the form of a circle and adapted to be arranged within an encircling pulley-hub formed with a centripetal projection or shoulder D, against which the ends of the strips abut and also having a lubricating-passage with which the recesses C C and opening F communicate, for the purpose set forth.

In testimony that we claim the foregoing as our invention we have signed our names, in presence of two witnesses, this 21st day of May, 1895.

JOHN WILLIAM SHEARD.
JOHN DONE.

Witnesses:
JAMES BLAYLOCK,
JOHN SAMUEL CARLISLE.